(No Model.)

D. SCHWARZ & G. LUXEDER.
COMBINED CYCLE STAND AND MUD GUARD.

No. 573,542. Patented Dec. 22, 1896.

WITNESSES
INVENTORS
D. Schwarz
G. Luxeder
BY
ATTORNEYS

UNITED STATES PATENT OFFICE.

DANIEL SCHWARZ AND GUIDO LUXEDER, OF TEMESVAR, AUSTRIA-HUNGARY.

COMBINED CYCLE-STAND AND MUD-GUARD.

SPECIFICATION forming part of Letters Patent No. 573,542, dated December 22, 1896.

Application filed March 28, 1896. Serial No. 585,298. (No model.)

*To all whom it may concern:*

Be it known that we, DANIEL SCHWARZ and GUIDO LUXEDER, subjects of the Emperor of Austria-Hungary, and residents of the city of Temesvar, in the Kingdom of Hungary, Austro-Hungarian Empire, have invented certain new and useful Improvements in a Combined Cycle-Stand and Mud-Guard; and we hereby declare that the following is a full, clear, and exact specification of same.

Our invention relates to a combined stand for cycles (and in particular bicycles) and a mud-guard. Its object is to provide a simple means whereby bicycles can be supported in a vertical position without the handles or pedals of same having to be leaned against a wall or other object.

We will explain our invention with reference to the accompanying drawings, in which—

Figure 1:
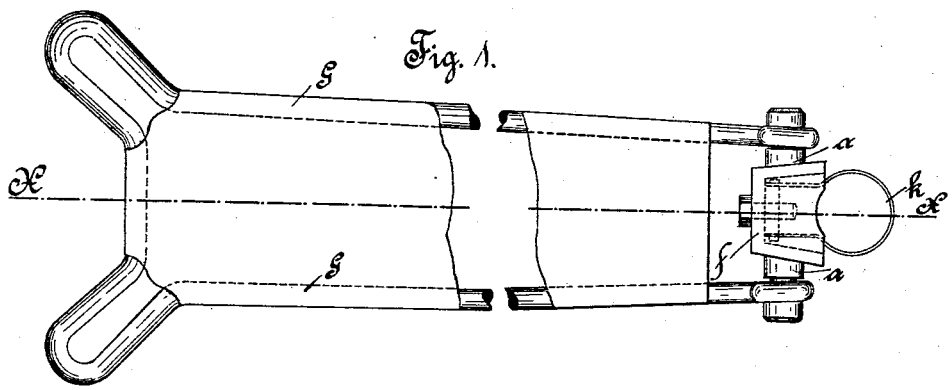
Figure 2:
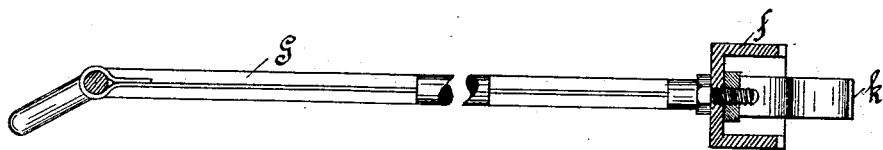
Figure 3:
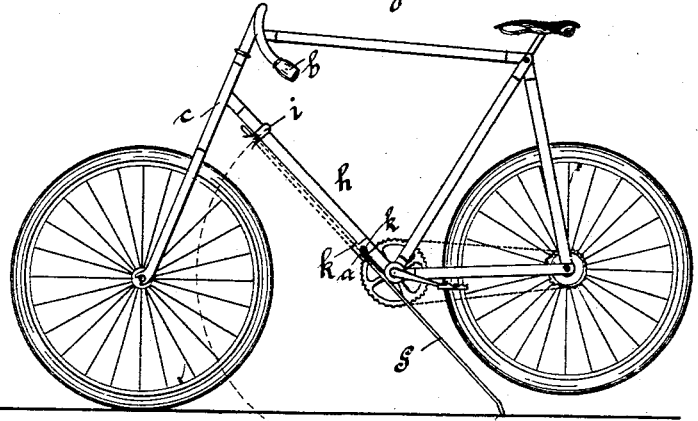

Figure 1 is a plan view of the combined stand and mud-guard. Fig. 2 is a sectional view on the line $x\,x$ of Fig. 1. Fig. 3 shows the combined stand and mud-guard attached to a bicycle.

The combined stand and mud-guard consists of a frame G, one end of which is connected with and turns on a pivot $a$. At the pivot $a$ is a bearing part $f$, which serves for securely holding a spring-clip $k$ attached to the bridge $h$, so that by means of this conical part and spring-clip the pivot $a$ can be firmly attached to the bridge. The frame G is covered with sail-cloth or other suitable material and when not in use as a stand serves as a mud-guard on being folded upward and fastened by means of the spring-catch $i$, fastened to the bridge $h$. When it is required to use the frame as a stand, all that is necessary is to raise the hind wheel of the bicycle and let down the stand, after having turned the pedals sufficiently to be out of the way.

Having now described our invention, what we claim, and desire to secure by Letters Patent, is—

A combined portable stand and mud-guard for bicycles, consisting of a frame covered with sail-cloth or other suitable material turning on a pivot, which said frame and pivot are attached to the bridge of the bicycle by means of a spring-clip, the said frame being held in position as a mud-guard by a spring-catch on the bridge, and as a stand, by resting the free end upon the ground, substantially as shown and described.

In witness whereof we have hereunto set our hands in presence of two witnesses.

DANIEL SCHWARZ.
GUIDO LUXEDER.

Witnesses:
HENRY GIBER,
RUDOLPH JÜNEFELD.